Aug. 19, 1930.    R. G. BARZEN    1,773,509
THRUST APPARATUS FOR FRICTION HOISTS
Filed July 11, 1928    2 Sheets-Sheet 2
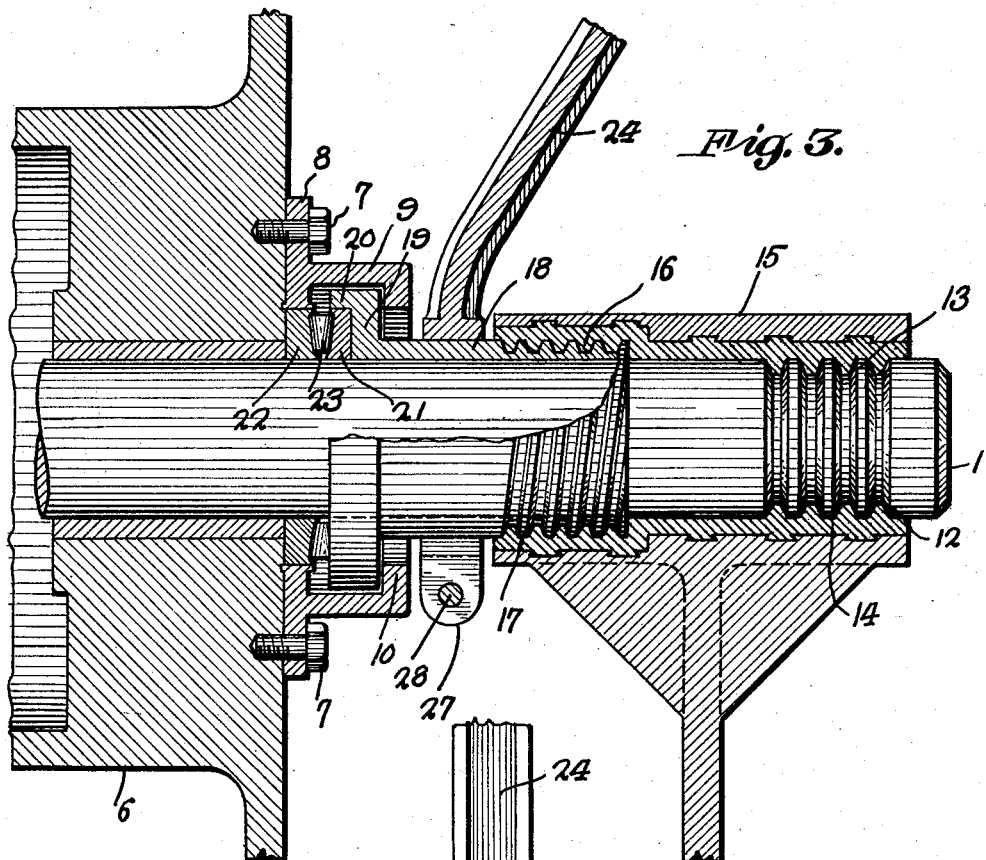
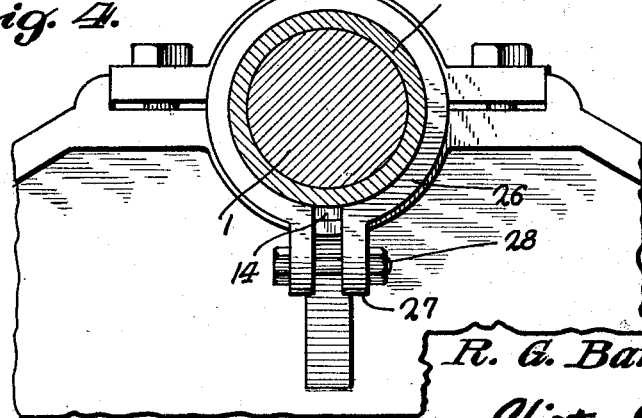
R. G. Barzen,
INVENTOR
BY Victor J. Evans
ATTORNEY Patented Aug. 19, 1930

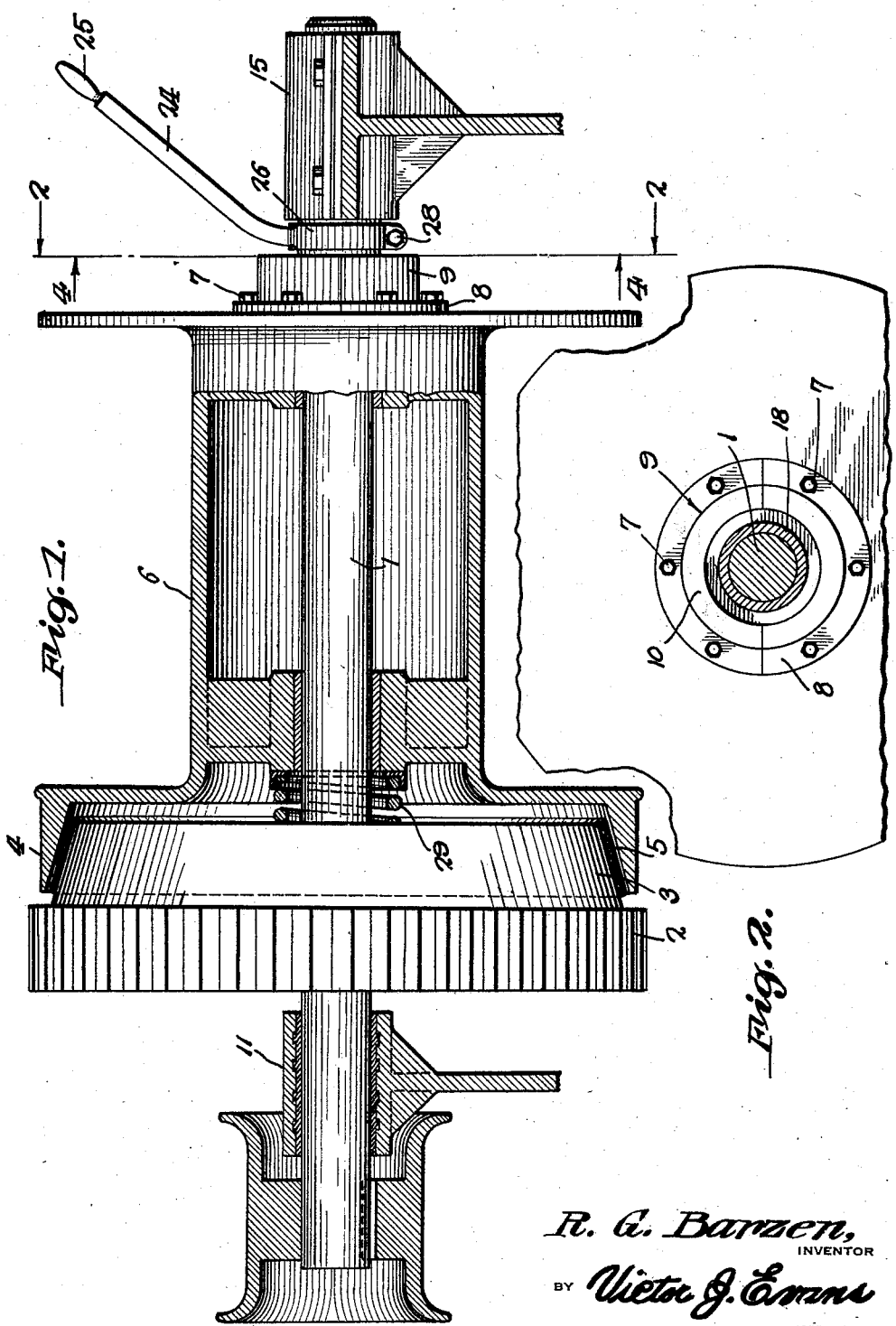

1,773,509

UNITED STATES PATENT OFFICE

RICHARD G. BARZEN, OF KANSAS CITY, MISSOURI

THRUST APPARATUS FOR FRICTION HOISTS

Application filed July 11, 1928. Serial No. 291,937.

This invention relates to hoisting devices, and the general object of the present invention is to provide a thrust apparatus for a friction hoist, that is capable of manual operation for moving the drum of the hoist in its respective clutched and unclutched positions in an easy and expeditious manner with very little effort.

Another object of the invention is to provide a thrust apparatus for hoisting devices that includes a manually operable controlling handle that can be adjusted to suit the operator's desires as well as existing conditions.

A still further object of the invention is to provide a thrust apparatus for friction hoisting drums that retains the drum under perfect control at all times.

A further object of the invention is to provide a thrust apparatus for the drum of a friction hoist, that is strong and sturdy, simple in construction, inexpensive to manufacture and install and is efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of a hoisting device showing the application of my thrust apparatus with parts broken away and in section.

Figure 2 is a sectional view taken approximately on line 2—2 of Figure 1 looking in the direction of the arrows.

Figure 3 is a view showing a portion of Figure 1 and illustrating my thrust apparatus in detail.

Figure 4 is a sectional view taken approximately on line 4—4 of Figure 1, looking in the direction of the arrows.

Referring to the drawings in detail, the reference numeral 1 indicates a drive shaft having secured thereto in any well known manner, the drive gear 2 having formed therewith the cone 3 of the friction clutch which also includes a collar 4 that cooperates with a friction band 5 riveted to the cone 3. The collar is formed with one side portion of the drum 6 of the hoist, which is loosely mounted on the drive shaft 1 and secured to the other side portion thereof through the medium of bolts 7 is the ring 8 of an annular housing 9 having formed on its outer edge an inwardly directed annular flange 10. The housing 9 may be formed in one piece or by two sections.

The drive shaft 1 has one end mounted for rotation in a bearing 11 while its opposite end is provided with annular grooves 12 forming ribs 13 received for fitting engagement in grooves formed in one end portion of a Babbitt sleeve 14 which is secured in a bearing sleeve 15.

The bearing sleeve 15 is formed with an annular recess at its inner end and the Babbitt sleeve 14 is relatively offset at this mentioned end in order to fill the recess.

The portion of the Babbitt sleeve which fills the recess has its inner surface formed with screw threads 16 for the purpose of accommodating like screw threads 17 formed on one end of a thrust sleeve 18 which is mounted for rotary and longitudinal movement on the drive shaft 1. The thrust sleeve 18 has formed on its inner end a collar 19 having extending inwardly therefrom an annular flange 20, and said collar and flange 20 receives a bearing race 21 which cooperates with a bearing race 22 for the purpose of receiving roller bearings 23 therebetween as best shown in Figure 3. The bearing race 22 is disposed in contacting engagement with the outer face of the side of the drum opposite the clutch collar 4, and these bearing races 21 and 22 loosely surround the shaft 1 and are movable thereon through the medium of the thrust sleeve 18 for disposing the collar 4 in contacting engagement with the friction band 5 of the cone 3 for rotating the drum, as will be apparent.

Secured to the thrust collar between the inner edge of the bearing sleeve 15 and the annular flange 10 of the housing 9 is an operating handle 24 having the usual gripping end 25 at its free end and its opposite end is in the form of a clamping ring 26 provided with apertured ears 27 for receiving a bolt and nut connection 28 whereby the handle may be clamped in any desired position on the thrust collar 18 for moving said collar circumferentially of the drive shaft 1.

From the above description and disclosure of the drawings, it will be obvious that upon moving the operating handle 24 in one direction for partially rotating the thrust sleeve on the shaft 1, the screw threads will cause the collar to move longitudinally on said shaft and thereby cause the drum to be disposed in clutched engagement with the cone 3, and while I may employ a coil spring 29 between one of the bearings of the drum 6 and the cone, for urging the drum to its unclutched position, a movement of the handle in a position reversed from that just described will cause the collar 19 to engage the annular flange 10 for moving the drum to its unclutched position with the result the spring 29 can be dispensed with if desired.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a hoisting device, the combination with the drum thereof, of an end thrust mechanism for said drum comprising a sectional housing, a ring included in said housing and secured to said drum, a drive shaft, ribs formed in said drive shaft, a bearing including a Babbitt sleeve having grooves to accommodate said ribs for rotation therein, said Babbitt sleeve being formed with screw threads, a threaded thrust sleeve having its threads received in the threads of the Babbitt sleeve, means arranged in the housing and being formed with said thrust sleeve, said means being adapted for moving said drum longitudinally on said shaft, and a handle for rotating said thrust sleeve for moving the same longitudinally on said shaft.

2. In a hoisting device, the combination with the drum thereof, an end thrust mechanism for said drum comprising a housing, a ring included in said housing and secured to said drum, a shaft for the drum, a bearing including a sleeve of low melting point antifriction bearing metal formed with screw threads, a threaded thrust sleeve having its threads received in the threads of the bearing sleeve, means arranged in the housing and formed with said thrust sleeve, adapted for moving said drum longitudinally on said shaft, and means for rotating said thrust sleeve for moving the same longitudinally on said shaft.

3. In a device of the character described including a shaft, a driven member on the shaft, a clutch member on the shaft for engagement with the driven member, a threaded sleeve rotatable on the shaft to cause engagement of the driven member with the clutch member, a bearing member for the shaft receiving the threaded portion of the sleeve, a bearing metal sleeve secured in the bearing member having threads for engaging the threads of the sleeve, and means on the shaft for engaging the bearing to prevent longitudinal movement of the shaft.

In testimony whereof I affix my signature.

RICHARD G. BARZEN.